US010662986B2

(12) United States Patent
Glover et al.

(10) Patent No.: US 10,662,986 B2
(45) Date of Patent: May 26, 2020

(54) USE OF TREATING ELEMENTS TO FACILITATE FLOW IN VESSELS

(71) Applicant: CRYSTAPHASE PRODUCTS, INC., Houston, TX (US)

(72) Inventors: John N. Glover, Houston, TX (US); Peter Gregory Ham, Houston, TX (US); Austin Schneider, Humble, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 0 days.

(21) Appl. No.: 16/379,198

(22) Filed: Apr. 9, 2019

(65) Prior Publication Data

US 2019/0242412 A1 Aug. 8, 2019

Related U.S. Application Data

(63) Continuation of application No. 16/105,781, filed on Aug. 20, 2018, which is a continuation of application No. 15/720,751, filed on Sep. 29, 2017, now Pat. No. 10,161,428, which is a continuation of application No. 15/676,603, filed on Aug. 14, 2017, now Pat. No. 10,054,140, which is a continuation of application No. 15/265,405, filed on Sep. 14, 2016, now Pat. No. 9,732,774.

(60) Provisional application No. 62/314,069, filed on Mar. 28, 2016, provisional application No. 62/294,768, filed on Feb. 12, 2016.

(51) Int. Cl.
*F15D 1/00* (2006.01)
*B01J 19/30* (2006.01)
*B01J 8/04* (2006.01)

(52) U.S. Cl.
CPC ............... *F15D 1/00* (2013.01); *B01J 8/04* (2013.01); *B01J 8/0453* (2013.01); *B01J 19/30* (2013.01); *B01J 2208/0084* (2013.01); *B01J 2208/00672* (2013.01); *B01J 2208/00938* (2013.01); *B01J 2208/025* (2013.01); *B01J 2208/027* (2013.01); *B01J 2219/30207* (2013.01); *B01J 2219/30211* (2013.01); *B01J 2219/30215* (2013.01); *B01J 2219/30219* (2013.01); *B01J 2219/30296* (2013.01); *B01J 2219/30416* (2013.01); *B01J 2219/30475* (2013.01); *B01J 2219/30483* (2013.01); *B01J 2219/315* (2013.01)

(58) Field of Classification Search
CPC ...... B01J 2208/025; B01J 8/0453; B01J 8/04; B01J 2219/30296; B01J 2219/30211; B01J 2219/30207; B01J 2208/00672; B01J 2208/00938; B01J 2208/0084; B01J 2219/30483; B01J 2219/30475; B01J 2219/30219; B01J 2219/30215; B01J 2219/315; B01J 2208/027; B01J 2219/30416; B01J 19/30

See application file for complete search history.

(56) References Cited

U.S. PATENT DOCUMENTS

| 436,414 A | 9/1890 | Graham |
| 578,548 A | 3/1897 | Deruelle |
| 598,351 A | 2/1898 | Staub |
| 1,947,777 A | 2/1934 | Huff et al. |
| 2,000,078 A | 5/1935 | Haseltine |
| 2,006,078 A | 6/1935 | Pyzel |
| 2,055,162 A | 9/1936 | Friedrich |
| 2,153,599 A | 4/1939 | Thomas |
| 2,183,657 A | 12/1939 | Age |
| 2,212,932 A | 8/1940 | Fairlie |
| 2,408,164 A | 9/1946 | Foster |
| 2,439,021 A | 4/1948 | Quigg |
| 2,571,958 A | 10/1951 | Slaughter et al. |
| 2,739,118 A | 3/1956 | Comte |
| 2,793,017 A | 5/1957 | Lake |
| 2,893,852 A | 7/1959 | Montgomery |
| 2,919,981 A | 1/1960 | Calva |
| 2,985,589 A | 5/1961 | Broughton et al. |
| 3,090,094 A | 5/1963 | Schwartzalder et al. |
| 3,100,688 A | 8/1963 | Dess |
| 3,151,187 A | 9/1964 | Comte |
| 3,167,600 A | 1/1965 | Worman |
| 3,169,839 A | 2/1965 | Calva |

(Continued)

FOREIGN PATENT DOCUMENTS

| AL | 2007-514529 | 6/2007 |
| AU | 2004232690 | 11/2004 |

(Continued)

OTHER PUBLICATIONS

European Patent Office; PCT International Search Report, Issued in Connection to PCT/US2017/017398; 5 pages; Europe.
European Patent Office; PCT Written Opinion of the International Searching Authority, Issued in Connection to PCT/US2017/017398; 9 pages; Europe.
Narayan Rashmi; Particle Capture From Non-Aqueous Media on Packed Beds; Dept. of Chemical and Materials Engineering; Fall 1996; Edmonton Alberta.
Dr. Ken J. Mills; Ceramic Guard Bed Materials; Seminar for CatCon '98; Jun. 3-5, 1998, Akron, Ohio.

(Continued)

*Primary Examiner* — Robert D Harlan
(74) *Attorney, Agent, or Firm* — Greenberg Traurig LLP

(57) ABSTRACT

A method for facilitating the distribution of the flow of one or more streams within a bed vessel is provided. Disposed within the bed vessel are internal materials and structures including multiple operating zones. One type of operating zone can be a processing zone composed of one or more beds of solid processing material. Another type of operating zone can be a treating zone. Treating zones can facilitate the distribution of the one or more streams fed to processing zones. The distribution can facilitate contact between the feed streams and the processing materials contained in the processing zones.

25 Claims, 7 Drawing Sheets

(56) References Cited

U.S. PATENT DOCUMENTS

| | | |
|---|---|---|
| 3,171,820 A | 3/1965 | Volz |
| 3,175,918 A | 3/1965 | McGahan |
| 3,208,833 A | 9/1965 | Carson |
| 3,214,247 A | 10/1965 | Broughton |
| 3,232,589 A | 2/1966 | Eckert |
| 3,361,839 A | 1/1968 | Lester |
| 3,410,057 A | 11/1968 | Lerner |
| 3,423,185 A | 1/1969 | Ballard et al. |
| 3,431,082 A | 3/1969 | Sellin |
| 3,487,112 A | 12/1969 | Paulik et al. |
| 3,489,529 A | 1/1970 | Dudych et al. |
| 3,498,755 A * | 3/1970 | Borre ............ B01J 8/048 422/220 |
| 3,506,248 A | 4/1970 | Starbuck et al. |
| 3,544,457 A | 12/1970 | Fredrick et al. |
| 3,562,800 A | 2/1971 | Carlson |
| 3,563,887 A | 2/1971 | Sommers et al. |
| 3,635,943 A | 1/1972 | Stewart |
| 3,657,864 A | 4/1972 | Davis, Jr. et al. |
| 3,685,971 A | 8/1972 | Carson |
| 3,706,812 A | 12/1972 | Derosset et al. |
| 3,717,670 A | 2/1973 | Schultz |
| 3,732,078 A | 5/1973 | Kassarjian |
| 3,787,188 A | 1/1974 | Lyon |
| 3,787,189 A | 1/1974 | Lovell et al. |
| 3,789,989 A | 2/1974 | Carson |
| 3,796,657 A | 3/1974 | Pretorius et al. |
| 3,844,936 A | 10/1974 | Newson |
| 3,888,633 A | 6/1975 | Grosboll et al. |
| 3,892,583 A | 7/1975 | Winter et al. |
| 3,898,180 A | 8/1975 | Crooks et al. |
| 3,947,347 A | 3/1976 | Mitchell |
| 3,960,508 A | 6/1976 | Bessant et al. |
| 3,962,078 A | 6/1976 | Hirs |
| 3,992,282 A | 11/1976 | Grosboll et al. |
| 4,029,482 A | 6/1977 | Postma et al. |
| RE29,314 E | 7/1977 | Carlson et al. |
| RE29,315 E | 7/1977 | Carlson et al. |
| 4,033,727 A | 7/1977 | Vautrain |
| 4,086,307 A | 4/1978 | Glaspie |
| 4,149,862 A | 4/1979 | Sewell, Sr. |
| 4,188,197 A | 2/1980 | Amberkar et al. |
| 4,197,205 A | 4/1980 | Hirs |
| 4,203,935 A | 5/1980 | Hackenjos |
| 4,251,239 A | 2/1981 | Clyde et al. |
| 4,285,910 A | 8/1981 | Kennedy, Jr. |
| 4,329,318 A | 5/1982 | Le Grouyellec et al. |
| 4,342,643 A | 8/1982 | Kyan |
| 4,374,020 A | 2/1983 | Trevino et al. |
| 4,378,292 A | 3/1983 | Haase |
| 4,380,529 A | 4/1983 | Gupta |
| 4,402,832 A | 9/1983 | Gerhold |
| 4,443,559 A | 4/1984 | Smith, Jr. |
| 4,478,721 A | 10/1984 | Gerhold |
| 4,483,771 A | 11/1984 | Koch |
| 4,487,727 A | 12/1984 | Ballato, Jr. |
| 4,504,396 A | 3/1985 | Vardi et al. |
| 4,511,519 A | 4/1985 | Hsia |
| 4,568,595 A | 2/1986 | Morris |
| 4,569,821 A | 2/1986 | Duperray et al. |
| 4,579,647 A | 4/1986 | Smith |
| 4,615,796 A | 10/1986 | Kramer |
| 4,642,089 A | 2/1987 | Zupkas et al. |
| 4,642,397 A | 2/1987 | Zinnen et al. |
| 4,668,442 A | 5/1987 | Lang |
| 4,669,890 A | 6/1987 | Peyrot |
| 4,681,674 A | 7/1987 | Graven et al. |
| 4,691,031 A | 9/1987 | Suciu et al. |
| 4,708,852 A | 11/1987 | Helbling, Jr. |
| 4,711,930 A | 12/1987 | Hoelderick et al. |
| 4,719,090 A | 1/1988 | Masaki |
| 4,726,825 A | 2/1988 | Natale |
| 4,775,460 A | 10/1988 | Reno |
| 4,788,040 A | 11/1988 | Campagnolo et al. |
| 4,798,676 A | 1/1989 | Matkovich |
| 4,810,685 A | 3/1989 | Twigg et al. |
| 4,830,736 A | 5/1989 | Hung et al. |
| 4,849,569 A | 7/1989 | Smith, Jr. |
| 4,859,642 A | 8/1989 | Hoelderick et al. |
| 4,863,712 A | 9/1989 | Twigg et al. |
| 4,880,541 A | 11/1989 | Chiron et al. |
| 4,938,422 A | 7/1990 | Koves |
| 4,950,834 A | 8/1990 | Arganbright et al. |
| 4,954,251 A | 9/1990 | Barnes et al. |
| 4,968,651 A | 11/1990 | Crabtree |
| 4,971,771 A | 11/1990 | Stahl |
| 4,982,022 A | 1/1991 | Smith, Jr. |
| 4,985,211 A | 1/1991 | Akiyama et al. |
| 5,013,426 A | 5/1991 | Dang Vu et al. |
| 5,017,542 A | 5/1991 | Martan et al. |
| 5,043,506 A | 8/1991 | Crossland |
| 5,055,627 A | 10/1991 | Smith, Jr. et al. |
| 5,104,546 A | 4/1992 | Filson et al. |
| 5,113,015 A | 5/1992 | Palmer et al. |
| 5,118,873 A | 6/1992 | Smith, Jr. |
| 5,122,276 A | 6/1992 | Loikits |
| 5,143,700 A | 9/1992 | Anguil |
| 5,177,961 A | 1/1993 | Whittenberger |
| 5,189,001 A | 2/1993 | Johnson |
| 5,202,097 A | 4/1993 | Poussin |
| 5,217,603 A | 6/1993 | Inouse et al. |
| 5,235,102 A | 8/1993 | Palmer et al. |
| 5,243,115 A | 9/1993 | Smith, Jr. et al. |
| 5,248,836 A | 9/1993 | Bakshi et al. |
| 5,298,226 A | 3/1994 | Nowobilski |
| 5,304,423 A | 4/1994 | Niknafs et al. |
| 5,326,512 A | 7/1994 | Stillwagon et al. |
| 5,336,656 A | 8/1994 | Campbell |
| 5,368,722 A | 11/1994 | Bartholdy |
| 5,384,300 A | 1/1995 | Feeley et al. |
| 5,384,302 A | 1/1995 | Gerdes et al. |
| 5,399,535 A | 3/1995 | Whitman |
| 5,409,375 A | 4/1995 | Butcher |
| 5,446,223 A | 8/1995 | Smith, Jr. |
| 5,454,947 A | 10/1995 | Olapinski et al. |
| 5,476,978 A | 12/1995 | Smith, Jr. et al. |
| 5,510,056 A | 4/1996 | Jacobs et al. |
| 5,512,530 A | 4/1996 | Gerdes et al. |
| 5,523,503 A | 6/1996 | Funk et al. |
| 5,538,544 A | 7/1996 | Nowobilski et al. |
| 5,558,029 A | 9/1996 | Peake |
| 5,599,363 A | 2/1997 | Percy |
| 5,624,547 A | 4/1997 | Sudhaker et al. |
| D381,394 S | 7/1997 | Lex, Jr. et al. |
| 5,660,715 A | 8/1997 | Trimble et al. |
| 5,670,095 A | 9/1997 | Southam |
| 5,766,290 A | 6/1998 | Zievers et al. |
| 5,767,470 A | 6/1998 | Cha |
| 5,779,993 A | 7/1998 | Gentry |
| 5,785,851 A | 7/1998 | Morris et al. |
| 5,799,596 A | 9/1998 | Peake |
| 5,817,594 A | 10/1998 | McNamara et al. |
| 5,853,579 A | 12/1998 | Rummier et al. |
| 5,853,582 A | 12/1998 | Grangeon et al. |
| 5,866,736 A | 2/1999 | Chen |
| 5,873,998 A | 2/1999 | Grangeon et al. |
| 5,895,572 A | 4/1999 | Joulin et al. |
| 5,901,575 A | 5/1999 | Sunder |
| 5,910,241 A | 6/1999 | McNamara et al. |
| 5,943,969 A | 8/1999 | Peake |
| 5,972,214 A | 10/1999 | Callebert et al. |
| 6,024,871 A | 2/2000 | Harter et al. |
| 6,033,629 A | 3/2000 | Friederick et al. |
| 6,036,743 A | 3/2000 | Butcher et al. |
| 6,096,278 A | 8/2000 | Gary |
| 6,117,812 A | 9/2000 | Gao et al. |
| 6,156,197 A | 12/2000 | Dessapt et al. |
| 6,242,661 B1 | 6/2001 | Podrebarac et al. |
| 6,258,900 B1 | 7/2001 | Glover |
| 6,262,131 B1 | 7/2001 | Arcuri et al. |
| 6,284,022 B1 | 9/2001 | Sachweh et al. |
| 6,291,603 B1 | 9/2001 | Glover |
| 6,315,972 B1 | 11/2001 | Mehdizadeh et al. |
| 6,352,579 B1 | 3/2002 | Hirata et al. |

(56) References Cited

U.S. PATENT DOCUMENTS

| | | |
|---|---|---|
| 6,402,959 B1 | 6/2002 | Dessapt et al. |
| 6,454,948 B2 | 9/2002 | Ferschneider et al. |
| 6,521,562 B1 | 2/2003 | Clem et al. |
| 6,583,329 B1 | 6/2003 | Podrebarac |
| 6,630,078 B2 | 10/2003 | Kourtakis et al. |
| 6,713,772 B2 | 3/2004 | Goodman et al. |
| 6,797,175 B2 | 9/2004 | Hotter |
| 6,835,224 B2 | 12/2004 | Cheng |
| 6,890,878 B2 | 5/2005 | Moore |
| 7,014,175 B2 | 3/2006 | Honnell |
| 7,125,490 B2 | 10/2006 | Clendenning et al. |
| 7,255,917 B2 | 8/2007 | Rochlin et al. |
| 7,265,189 B2 | 9/2007 | Glover |
| 7,314,551 B2 | 1/2008 | Frey et al. |
| 7,390,403 B2 | 6/2008 | Siwak |
| 7,393,510 B2 | 7/2008 | Glover |
| 7,427,385 B2 | 9/2008 | Scheirer et al. |
| 7,527,671 B1 | 5/2009 | Stuecker et al. |
| 7,722,832 B2 | 5/2010 | Glover |
| 7,741,502 B2 | 6/2010 | Lecocq et al. |
| 8,062,521 B2 | 11/2011 | Glover |
| 8,282,890 B2 | 10/2012 | Niknafa et al. |
| 8,293,195 B2 * | 10/2012 | Blanchard ............ B01J 8/0085 422/607 |
| 8,313,709 B2 | 11/2012 | Glover |
| 8,500,852 B2 | 8/2013 | Galbraith |
| 8,524,164 B2 | 9/2013 | Glover |
| 8,550,157 B2 | 10/2013 | O'Malley |
| 8,663,474 B2 | 3/2014 | Niazi |
| 9,056,268 B2 | 6/2015 | Jones et al. |
| 9,101,863 B2 | 8/2015 | Glover |
| 9,205,392 B2 | 12/2015 | Byl et al. |
| 9,352,292 B2 | 5/2016 | Solantie et al. |
| 9,732,774 B1 | 8/2017 | Glover |
| 10,054,140 B2 | 8/2018 | Glover et al. |
| 10,161,428 B2 | 12/2018 | Glover et al. |
| 10,421,067 B2 | 9/2019 | Glover |
| 10,421,068 B2 | 9/2019 | Glover |
| 10,449,531 B2 | 10/2019 | Glover |
| 10,500,581 B1 | 12/2019 | Glover |
| 10,525,456 B2 | 1/2020 | Glover |
| 10,543,483 B2 | 1/2020 | Glover |
| 2001/0015336 A1 | 8/2001 | Glover |
| 2002/0146358 A1 | 10/2002 | Smith et al. |
| 2003/0125594 A1 | 7/2003 | Moore |
| 2004/0031729 A1 | 2/2004 | Meier et al. |
| 2004/0084352 A1 | 5/2004 | Meier et al. |
| 2004/0192862 A1 | 9/2004 | Glover |
| 2004/0225085 A1 | 11/2004 | Glover |
| 2005/0240038 A1 | 10/2005 | Gobbel et al. |
| 2005/0255014 A1 | 11/2005 | Glover |
| 2006/0009648 A1 | 1/2006 | Gobbel et al. |
| 2006/0108274 A1 | 5/2006 | Frey et al. |
| 2006/0196826 A1 | 7/2006 | Glover |
| 2006/0251555 A1 | 11/2006 | Warner et al. |
| 2006/0275185 A1 | 12/2006 | Tonkovich et al. |
| 2007/0158277 A1 | 7/2007 | Bachand et al. |
| 2007/0265357 A1 | 11/2007 | Iversen et al. |
| 2008/0044316 A1 | 2/2008 | Glover |
| 2008/0296216 A1 | 12/2008 | Glover |
| 2009/0044702 A1 | 2/2009 | Adamek et al. |
| 2009/0146339 A1 | 6/2009 | Malone et al. |
| 2009/0211441 A1 | 8/2009 | Reyes et al. |
| 2009/0283479 A1 | 11/2009 | Warner et al. |
| 2010/0209315 A1 * | 8/2010 | Niknafs ............... B01J 8/025 422/198 |
| 2010/0243519 A1 | 9/2010 | Glover |
| 2010/0243520 A1 | 9/2010 | Glover |
| 2011/0200478 A1 | 8/2011 | Billiet |
| 2012/0211438 A1 | 8/2012 | Glover |
| 2012/0237434 A1 | 9/2012 | Blanchard et al. |
| 2013/0306562 A1 | 11/2013 | Stifter et al. |
| 2015/0053627 A1 | 2/2015 | Silin et al. |
| 2015/0129512 A1 | 5/2015 | Thiyagarajan |
| 2016/0136603 A1 | 5/2016 | Parihar et al. |
| 2017/0189834 A1 | 7/2017 | Glover |
| 2017/0234339 A1 | 8/2017 | Glover |
| 2018/0008952 A1 | 1/2018 | Glover |
| 2018/0023598 A1 | 1/2018 | Glover |
| 2018/0093207 A1 | 4/2018 | Glover et al. |
| 2019/0048903 A1 | 2/2019 | Glover et al. |
| 2019/0217283 A1 | 7/2019 | Glover et al. |
| 2019/0285098 A1 | 9/2019 | Glover et al. |
| 2019/0301498 A1 | 10/2019 | Glover |
| 2019/0301499 A1 | 10/2019 | Glover |
| 2019/0358620 A1 | 11/2019 | Glover |

FOREIGN PATENT DOCUMENTS

| | | |
|---|---|---|
| AU | 2010203014 | 8/2010 |
| CA | 2019928 | 12/1991 |
| CA | 2520071 | 4/2004 |
| CA | 2297113 | 2/2005 |
| CA | 2570527 | 12/2005 |
| CN | 202072546 | 12/2011 |
| CN | 203382593 | 1/2014 |
| DE | 585595 | 10/1933 |
| DE | 3539195 | 5/1986 |
| EP | 73150 | 3/1983 |
| EP | 260826 | 3/1988 |
| EP | 576096 | 12/1993 |
| EP | 639544 | 2/1995 |
| EP | 651041 | 5/1995 |
| EP | 719578 | 7/1996 |
| EP | 1001837 | 7/1998 |
| EP | 0899011 | 3/1999 |
| EP | 1606038 | 12/2005 |
| EP | 1755766 | 2/2007 |
| EP | 3040119 | 6/2016 |
| EP | 3397364 | 11/2018 |
| EP | 3414003 | 12/2018 |
| FR | 2480137 | 10/1981 |
| FR | 2851559 | 8/2004 |
| GB | 267877 | 1/1927 |
| GB | 374707 | 7/1932 |
| GB | 429616 | 6/1935 |
| GB | 933124 | 8/1963 |
| GB | 1442085 | 7/1976 |
| GB | 2108003 | 5/1983 |
| GB | 2149771 | 6/1985 |
| JP | 5237396 | 9/1977 |
| JP | 5567309 | 5/1980 |
| JP | 5817818 | 2/1983 |
| JP | S581983-024308 | 2/1983 |
| JP | S61 (1986)-134300 | 6/1986 |
| JP | 61132097 | 8/1986 |
| JP | S61(1986)-180818 | 8/1986 |
| JP | 52114643 | 5/1987 |
| JP | S63 (1988)-043632 | 3/1988 |
| JP | 4187297 | 7/1992 |
| JP | H061994-205922 | 7/1994 |
| JP | 1028876 | 2/1998 |
| JP | 1057821 | 3/1998 |
| JP | 11128734 | 5/1999 |
| JP | 2000-246048 | 9/2000 |
| JP | 2003-120257 | 4/2003 |
| JP | 2004-515432 | 5/2004 |
| JP | 2004-530746 | 10/2004 |
| JP | 2004-537406 | 12/2004 |
| JP | 2006-55749 | 3/2006 |
| JP | 2006-205068 | 8/2006 |
| JP | 2006-523139 | 10/2006 |
| JP | 2008-545527 | 12/2008 |
| JP | 5543817 | 7/2014 |
| JP | 2015-085208 | 5/2015 |
| JP | 2016-13748 | 8/2016 |
| JP | 2018-61955 | 4/2018 |
| JP | 6324420 | 5/2018 |
| KR | 1221298 | 1/2013 |
| NL | 1009499 | 1/2000 |
| NZ | 542787 | 6/2009 |
| WO | 99/03561 | 1/1999 |
| WO | 2001001536 | 1/2001 |
| WO | 2002/045838 | 6/2002 |

(56) References Cited

FOREIGN PATENT DOCUMENTS

| | | |
|---|---|---|
| WO | 2002079346 | 10/2002 |
| WO | 2003013725 | 2/2003 |
| WO | 2004094039 | 11/2004 |
| WO | 2005058472 | 6/2005 |
| WO | 2005123221 | 12/2005 |
| WO | 2006127671 | 11/2006 |
| WO | 2010149908 | 12/2010 |
| WO | 2015/037730 | 3/2015 |
| WO | 2015/200513 | 12/2015 |
| WO | 2017117492 | 7/2017 |
| WO | 2017139597 | 8/2017 |
| WO | 2019020705 | 1/2019 |
| ZA | 200508048 | 11/2006 |

OTHER PUBLICATIONS

Kenneth R. Butcher; Reticulated Ceramic Foam as a Catalyst Support; Seminar for CatCon '98; Jun. 3-5, 1998; Akron Ohio.
Woodward et al.; Akzo Chemicals' Guard Bed Technology; 1991.
Norton Chemical Process Products Corp.; Denstone Inert Catalyst Bed Supports; 1992; 10 pages; Akron Ohio.
Petro Ware, Inc.; 86 Catalyst Support Media "Premium, Quality from Beginning to End"; Crooksville, Ohio.
Strom, et al.; Advanced Reticulated Ceramics; Hi-Tech Ceramics; p. 14-19. undated.
Sweeting, et al.; Reticulated Ceramics for Catalyst Support Applications; Hi-Tech Ceramics, Inc.; Nov. 30, 1994.
Hi-Tech Ceramics; Reticel, Designing the Future with Advanced Reticulated Ceramics; Product Brochure; undated.
Ceramic Industry Cover Page and Table of Contents; vol. 147, No. 3, Mar. 1997.
Selee Corporation; Product Brochure; undated.
Saxonburg Ceramics Incorporated; Product Material Specifications; undated.
Foseco Home Page; Internet; p. 1-3; Feb. 21, 1997.
Selee Corporation Home Page; Internet, Nov. 14, 1996.
Selee Corporation; Ceramic Foam for Thermal/Kiln Furniture Applications; Ceramic Foam Kiln Furniture Physical Property Data Sheet; Nov. 14, 1996.
NPRA Q&A Session on Refining and Petrochemical Technology, Section B. Hydrotreating; p. 85-101; 1990.
NPRA Q&A Session on Refining and Petrochemical Technology; Section B. Hydrotreating; p. 98-118; 1991.
NPRA Q&A Session on Refining and Petrochemical Technology; Section B. Hydrotreating; p. 104-135; 1992.
NPRA Q&A Session on Refining and Petrochemical Technology; Section B. Hydrotreating; p. 94-112; 1993.
NPRA Q&A Session on Refining and Petrochemical Technology; Section B. Hydrotreating; p. 98-139; 1994.
NPRA Q&A Session on Refining and Petrochemical Technology; Section B. Hydrotreating; p. 96-123; 1995.
NPRA Q&A Session on Refining and Petrochemical Technology; Section B. Hydrotreating; p. 131-160; 1996.
Koch; Reactor Internals by Koch, Your Way; undated.
Hickman, et al.; Production of Syngas by Direct Catalytic Ocidation of Methane; Science; vol. 259; p. 343-346; Jan. 15, 1993.
GKN Sinter Metals; Design Ideas and Application—Porous Discs; undated.
Sinter Metals; High Porosity SIKA-R. IS.TM., Porous Metal Filter Elements; undated.
Sinter Metals; Tool List, Seamless SIKA-Elements; undated.
Sinter Metals; High Porosity Sintered Mataerials; p. 1-16; undated, May 1997.
Christy Refractories Company; Prox-Svers Catalyst Support Media; 4/95.
Haldor Topsoe, Inc.; Material Safety Data Sheet Inert Topping TK-10; p. 1-4; 1992.
Criterion; Top Bed Catalysts and Support; undated.
Perry's Chemical Engineers' Handbook, 7th Ed., McGraw-Hill, 1997, pp. 6-33-6-34.
Schlichting, Boundary-Layer Theory; McGraw-Hill; (Translation of Grenzschicht-Theorie, Translated by Dr. J. Kestin), 1979; pp. 230-234.
Tan-Atichat and Nagib, "Interaction of free-stream turbulence with screens and grids: a balance between turbulence scales" J. Fluid Mech (1982), vol. 114, pp. 501-528; Great Britain.
Loehrke and Nagib, AGARD Report No. R-598 Experiments on Management of Free-stream Turbulence 1972.
Austrlian Government, IP Austrralia, Examination Report No. 1 for Standard Patent Application; 3 pages; Nov. 14, 2018; Australia.
Chilean Patent and Trademark Office; Abstract Publication of CL2131-2018; Sep. 28, 2018; 1 page; Chile.
European Patent Office; Communicaiton Pursuant to Rules 161(1) and 162 EPC, issued in connection to EP17706648.7; dated Sep. 19, 2018; 3 pages; Europe.
New Zealand Intellectual Property Office; First Examination Report, issued in connection to application No. 743895; dated Jan. 31, 2019; 5 pages; New Zealand.
European Patent Office; PCT International Search Report, Issued in Connection to PCT/US2006/019854; dated Jan. 17, 2007; 2 pages; Europe.
European Patent Office; PCT Written Opinion of the International Searching Authority, Issued in Connection to PCT/US2006/019854; dated Jan. 17, 2007; 5 pages; Europe.
European Patent Office; Communicaiton and Search Report, Issued in Connection to EP15192642.5; dated Jun. 2, 2016; 7 pages; Europe.
European Patent Office; Communication Pursuant to Article 94(3) EPC, Issued in Connection to EP04716499.1; May 9, 2016; 4 pages; Europe.
Gibson et al.; Cellular Solids: Structure and Properties; Second Edition, Cambridge Solid State Science Series, Cambridge University Press; 71 pages; 1997.
Sulzer; Structured Packings for Separation and Reactive Distillation Brochure; pp. 2-27; 2002-2003.
Rauschert; Hiflow Rings Brochure; 5 pages.
Behrens et al.; Performance of a Monolith-like Structured; Chem. Biochem. Eng. Q. 15 (2); pp. 49-57; 2001.
Sweeting et al.; High Surface Reticulated Ceramics for Catalytic Applications; Mat, Res. Soc. Symp. Proc., vol. 549; pp. 17-23; 1999.
Olujic et al.; Distillation Column Internals/Configurations for Press . . . , Chem. Biochem, Eng. Q. 17 (4); pp. 301-309; 2003.
Schildhauer; Application of Film-Flow-Monoliths . . . , Technical Univesity Delft; Julianalaan 136, NL-2628 BL Delft; The Netherlands; 1 page; Oct. 29, 2003.
Wadley; Cellular Metals Manufacutring; Advanced Engineering Materials; 4; No. 10; pp. 726-733; 2002.
Norton Chemical Process Products Corporation, MacroTrap Guard Bed Media; 6 pages: 1998.
Mills; Ceramic Technology Provides Refining Solutions, Saint-Gobain Norpro; pp. 1-17; 2003.
Beihai Huihuang Chemical Packing Co. Lts., http://77520.pub.diysite.com/sc.deliver/main/0-4-5/4/0-ma.html?siteid=77520; 10 pages; May 5, 2003.
Gibson; Cellular Solids, MRS Bulletin; www.mrs.org/publications/bulleting; pp. 270-274; Apr. 2003.
Green et al.; Cellular Ceramics: Intriguing Structures, Novel Properties, and Innovative Applications; www.mrs.org/publications/bulletin; pp. 296-300; Apr. 2003.
Colombo; Porous Ceramics and Ceramic Components from Preceramic Polymers; http://www.matse.psu.edu/people/faculty/colombo.html; 5 pages.
Kim et al.; Effect of Inert Filler Addition on Pore Size and Porosity of Closed-Cell Silicon Oxycarbide Foams; Journal of Materials Science 39; pp. 3513-3515; 2004.
Queheillalt et al.; Synthesis of Stochastic Open Cell Ni-Based Foams; Scripta Materialia 50; pp. 313-317; 2004.
Natural / Food Foams; 8 pages.
Brazilian National Institute of Industrial Property; Technical Examination Report, issued in connection to PI0613275-8; 16 pages; Brazil.

(56) References Cited

OTHER PUBLICATIONS

Scheffler, Michael; Cellular Ceramics: Structure, Manufacturing, Properties and Applications; Die Beutsche Bibliotheck; 2005; 5 pages; Germany.
Snyder Filtration; Nanofiltration Membranes; Retrieved Jun. 15, 2016 from: http://synderfiltration.com/nanofiltration/membranes/; 4 pages; Membrane Technology.
U.S. Patent and Trademark Office; Non-Final Office Action, Issued in Connection with U.S. Appl. No. 11/893,190; dated Mar. 10, 2010; 6 pages; U.S.
Applicant; Amendment and Response, Filed in Connection with U.S. Appl. No. 11/893,190; dated Aug. 20, 2010; 4 pages; U.S.
U.S. Patent and Trademark Office; Final Office Action, Issued in Connection with U.S. Appl. No. 11/893,190; dated Nov. 3, 2010; 5 pages; U.S.
Applicant; Response to Final Office Action, Filed in Connection with U.S. Appl. No. 11/893,190; dated Jan. 3, 2011; 5 pages; U.S.
U.S. Patent and Trademark Office; Non-Final Office Action, Issued in Connection with U.S. Appl. No. 11/893,190; dated Jan. 19, 2011; 5 pages; U.S.
Applicant; Amendment and Response, Filed in Connection with U.S. Appl. No. 11/893,190; dated Jul. 19, 2011; 4 pages; U.S.
U.S. Patent and Trademark Office; Final Office Action, Issued in Connection with U.S. Appl. No. 11/893,190; dated Sep. 22, 2011; 6 pages; U.S.
Applicant; Amendment and Response, Filed in Connection with U.S. Appl. No. 11/893,190; dated Dec. 16, 2011; 5 pages; U.S.
U.S. Patent and Trademark Office; Non-Final Office Action, Issued in Connection with U.S. Appl. No. 11/893,190; dated Jan. 27, 2012; 7 pages; U.S.
U.S. Patent and Trademark Office; Non-Final Office Action, Issued in Connection with U.S. Appl. No. 11/893,190; dated Feb. 3, 2012; 7 pages; U.S.
Applicant; Amendment and Response, Filed in Connection with U.S. Appl. No. 11/893,190; dated Aug. 3, 2012; 6 pages; U.S.
U.S. Patent and Trademark Office; Final Office Action, Issued in Connection with U.S. Appl. No. 11/893,190; dated Oct. 23, 2012; 9 pages; U.S.
Applicant; Amendment and Response, Filed in Connection with U.S. Appl. No. 11/893,190; dated Dec. 24, 2012; 8 pages; U.S.
U.S. Patent and Trademark Office; Advisory Action Before the Filing of an Appeal Brief, Issued in Connection with U.S. Appl. No. 11/893,190; dated Jan. 11, 2013; 3 pages; U.S.
Applicant; Amendment and Response, Filed in Connection with U.S. Appl. No. 11/893,190; dated Feb. 25, 2013; 4 pages; U.S.
U.S. Patent and Trademark Office; Notice of Allowance and Fee(s) Due, Issued in Connection with U.S. Appl. No. 11/893,190; dated May 2, 2013; 8 pages; U.S.
U.S. Court of Appeals Federal Circuit; *Purdue Pharma L.P. v. Faulding Inc.*, 56 USPQ2d 1481 (CA FC 2000); Oct. 25, 2000; 11 pages.
Selected relevant excerpts from file history of U.S. Appl. No. 11/893,190, filed Aug. 15, 2007 and assigned to Applicant for present application.
Notice of Allowance for U.S. Appl. No. 10/867,015 (now U.S. Pat. No. 7,393,510, dated Jul. 1, 2008).
New Zealand Intellectual Property Office; Further Examination Report, issued in connection to application No. 743891; dated Jun. 24, 2019; 9 pages; New Zealand.
Japanese Patent Office; Observation, issued in connection to JP2018-541647;dated Jun. 19, 2019; 40 pages; Japan.
The Japan Petroleum Institute; Petroleum Refining Process; Kodansha Ltd.; May 20, 1998; 6 pages; Japan.
Chen, Xiaodong et al.; Improving the Strength of ZTA Foams with Different Strategies: Immersion Infiltration and Recoating; www.mdpi.com/journal/material;; May 30, 2017; 15 pages.
Intellectual Property Office of Singapore; Written Opinion, issued in connection to application No. 11201805367W; dated Aug. 16, 2019; 7 pages; Singapore.

Australian Government, IP Australia, Examination Report No. 1 for Standard Patent Application, Issued in connection to AU2016381170; 3 pages; dated Apr. 10, 2019; Australia.
Canadian Intellectual Property Office; Official Action, issued in connection with CA3009825; dated Jun. 18, 2019; - pages; Canada.
European Patent Office; PCT International Search Report, Issued in Connection to PCT/US2005/020712; dated Mar. 3, 2006; 2 pages; Europe.
European Patent Office; PCT International Search Report, Issued in Connection to PCT/US2004/006366; dated Oct. 20, 2004; 2 pages; Europe.
European Patent Office; PCT International Search Report, Issued in Connection to PCT/US98/14768; dated Nov. 26, 1998; 3 pages; Europe.
European Patent Office; PCT International Search Report, Issued in Connection to PCT/US2016/069396; dated Mar. 31, 2017; 3 pages; Europe.
European Patent Office; PCT Written Opinion of the International Searching Authority, Issued in Connection to PCT/US2016/069396; dated Mar. 31, 2017; 6 pages; Europe.
European Patent Office; Communicaiton Pursuant to Rules 161(1) and 162 EPC, issued in connection to EP16834162.6; dated Aug. 8, 2018; 3 pages; Europe.
European Patent Office; Communication Pursuant to Article 94(3) EPC, issued in connection to EP15192642.5; dated Mar. 13, 2019; 5 pages; Europe.
European Patent Office; Communication pursuant to Article 94(3) EPC, issued in connection to EP04716499.1; dated Mar. 10, 2017; 5 pages; Europe.
European Patent Office; Communication Pursuant to Article 94(3) EPC, Issued in Connection to EP04716499.1; dated Mar. 15, 2013; 4 pages; Europe.
European Patent Office; Summons to attend oral proceedings pursuant to Rule 115(1) EPC, issued in connection to EP04716499.1; Feb. 12, 2018; 6 pages; Europe.
European Patent Office; Extended European Search Report, issued in connection to EP18201370.6; dated Apr. 9, 2019; 6 pages; Europe.
European Patent Office; Extended European Search Report, issued in connection to EP15192642.5; dated Jun. 2, 2016; 6 pages; Europe.
European Patent Office; Communication Pursuant to Article 94(3) EPC, issued in connection to EP98934597.0; dated Mar. 16, 2009; 3 pages; Europe.
European Patent Office; Communication Pursuant to Article 94(3) EPC, issued in connection to EP98934597.0; dated Jun. 21, 2006; 4 pages; Europe.
European Patent Office; Communication Pursuant to Article 96(2) EPC, issued in connection to EP98934597.0; dated Sep. 10, 2004; 4 pages; Europe.
European Patent Office; Communication Pursuant to Article 96(2) EPC, issued in connection to EP98934597.0; dated Dec. 11, 2002; 3 pages; Europe.
European Patent Office; Communication Pursuant to Article 96(2) EPC, issued in connection to EP98934597.0; dated Oct. 8, 2001; 2 pages; Europe.
European Patent Office; Communication Pursuant to Article 96(2) EPC, issued in connection to EP05760680.8; dated Jan. 28, 2009; 6 pages; Europe.
European Patent Office; Communication Pursuant to Article 96(2) EPC, issued in connection to EP05760680.8; dated Jul. 5, 2010; 5 pages; Europe.
Espacenet; English Translation of CN203382593U; Oct. 4, 2016; 7 pages; Europe.
Espacenet; English Translation of CN202072546U; Oct. 4, 2016; 11 pages; Europe.
Espacenet; English Translation of FR2851559A1; Oct. 4, 2016; 9 pages; Europe.
Espacenet; English Translation of WO2010149908A1; Oct. 4, 2016; 23 pages; Europe.
The International Bureau ot WIPO; PCT International Preliminary Report on Patentability, Issued in Connection to PCT/2005/020712; dated Dec. 14, 2006; 5 pages; Switzerland.

(56) References Cited

OTHER PUBLICATIONS

The International Bureau ot WIPO; PCT International Preliminary Report on Patentability, Issued in Connection to PCT/2004/006366; dated Oct. 1, 2005; 5 pages; Switzerland.
Japanese Patent Office; Notice of Reasons for Rejection, issued in connection to JP2010-246536; dated Sep. 1, 2012; 8 pages; Japan.
Japan Patent Office; Notice of Reasons for Rejection, issued in connection with JP2010-246536; dated Nov. 12, 2013; 6 pages; Japan.
Japan Patent Office; Certified Final Rejection, issued in connection with JP2010-246536; dated Jun. 25, 2014; 2 pages; Japan.
Japan Patent Office; Decision to Dismiss Amendment, issued in connection to JP2010-246536; dated Jun. 25, 2014; 3 pages; Japan.
Japanese Patent Office; Notice of Reasons for Rejection of Japanese Patent Application 2016-017373; dated Dec. 7, 2016; 11 pages; Japan.
Japanese Patent Office; Certified Decision of Dismissal of Amendment, issued in connection to JP2014-217190; 4 pages; Japan.
Japanese Patent Office; Certified Final Rejection, issued in connection to JP2014-217190; 3 Pp.; Japan.
Japanese Patent Office; Notice of Reasons for Rejection, issued in connection to JP2014-217190; dated Aug. 31, 2016; 6 pages; Japan.
Japanese Patent Office; Notice of Reasons for Rejection, issued in connection to JP2014-217190; dated Sep. 30, 2015; 8 pages; Japan.
Japanese Patent Office; Observation, issued in connection to JP2017-226648; dated Jul. 17, 2018; 50 pages; Japan.
Japanese Patent Office; Notice of Reasons for Rejection, issued in connection to JP2017-226648; dated Jan. 31, 2019; 10 pages; Japan.
Japanese Patent Office; Notice of Resons for Rejection, issued in connection to JP2018-553847; dated May 29, 2019; 10 pages; Japan.
New Zealand Intellectual Property Office; First Examination Report, issued in connection to application No. 743891; dated Nov. 6, 2018; 10 pages; New Zealand.
BT-750 3/4 D Ceramic Wagon Wheel Unit; 1 page.
Crystaphase Products, Inc.; Product Data Information: Ceramic Support—Recycled Silica Alumina; 1 page.
Fay; A Three-Point Generalization of the Ellipse; International Journal of Mathematical Education in Science and Technology; Jan. 2002; vol. 33, Issue 1; pp. 111-123.
Fulton; CE Refresher: Catalyst Engineering, Part 2, Selecting the Catalyst Configuaration; May 1986 Chemical engineering; pp. 97-101.
Haldor Topsoe; Topsoe Graded Bed Solutions; 3 pages.
Hung et al.; Translation of DE3539195, Hydroprocessing Catalyzer with Specific Geometric Shate; 23 pages; May 2000.
Ivars Peterson's MathLand; Beyond the Ellipse; The Mathematical Association of America; Sep. 2, 1996; 3 pages.
Materials 2017, 10(7), 735; "Improving the Strength of ZTA Foams with Different Strategies: Immersion Infiltration and Recoating;" https://doi.org/10.3390/ma10070735; 15 pages; Jul. 1, 2017.
Petrotech, vol. 4, pp. 382-383; 1981.
Product Bulletin: Criterion 855 MD "Medallions" Inert Catalyst Support; Aug. 1998; 2 pages.
Criterion; Technical Bulletin: Loading Your Hydrotreating Reactor for Maximum Activity; Criterion Catalysts & Technologies; 3 pages; 2008.
Saint-Gobain Norpro; Denstone® Deltrap® Support Media; 6 pages; printed Oct. 1, 2019; https://www.norpro.saint-gobain.com/support-media/denstone-deltap.
Saint-Gobain Norpro; Tools Help Optimize Selection of Denstone® Bed Support Media; Apr. 4, 2019; 4 pages; https://www.norpro.saint-gobain.com/articles/tools-help-optimize-selection-denstone-bed-support-media-article.
Chilean Patent and Trademark Office; Examiner Report, issued in connection to application No. 2131-2018; 17 pages; dated Aug. 29, 2019; Chile.
Chilean Patent and Trademark Office; Search Report, issued in connection to application No. 2131-2018; 3 pages; dated Aug. 29, 2019; Chile.
Japanese Patent Office; Notice of Reasons for Rejection, issued in connection to JP2018-541647; dated Aug. 28, 2019; 14 pages; Japan.
Intellectual Property Office of Singapore; Written Opinion, issued in connection to application No. 11201805491X; dated Aug. 29, 2019; 6 pages; Singapore.
Intellectual Property India; Examination Report, issued in connection to application No. 201837023710; dated Aug. 28, 2019; 6 pages; India.
Government of Chile, Ministry of Economy, Promotion and Tourism; Examiner's Report and Search Report, issued in connection to application No. 201801799; dated Aug. 9, 2019; 14 pages; Chile.
Canadian Intellectual Property Office; Official Action and Examination Search Report, issued in connection with CA3009845; dated Aug. 28, 2019; 4 pages; Canada.
Korean Intellectual Property Office; Notification of Provisional Rejection, issued in connection to application No. 10-2018-7021988; dated Oct. 22, 2019; 7 pages; Korea.
European Patent Office; Communication Pursuant to Article 94(3) EPC, issued in connection to EP17706648.7; dated Oct. 24, 2019; 7 pages; Europe.
Korean Intellectual Property Office; Notification of Provisional Rejection, issued in connection to application No. 10-2018-7026274; dated Oct. 22, 2019; 14 pages; Korea.
Australian Government, IP Australia, Examination Report No. 2 for Standard Patent Application, Issued in connection to AU2016381170; 3 pages; dated Nov. 8, 2019; Australia.
Japanese Patent Office; Final Rejection, issued in connection to application No. 2017-226648; dated Feb. 26, 2020; 6 pages; Japan.
Chilean Patent and Trademark Office; Examiner Report No. 2., issued in connection to application No. 1799-2018; dated Jan. 24, 2020; 12 pages; Chile.
European Patent Office; Communication pursuant to Article 94(3) EPC, issued in connection to EP16834162.6; dated Feb. 4, 2020; 7 pages; Europe.
Japanese Patent Office; Office Action, issued in connection to application No. 2018-553847; dated Feb. 26, 2020; 8 pages; Japan.
Intellectual Property Office of Singapore; Invitation to Respond to Written Opinion, issued in connection with application No. 11201805491X; dated Mar. 3, 2020; 6 pages; Singapore.
Indian Patent Office; Examination Report, issued in connection to application No. 201837023720; dated Jan. 23, 2020; 6 pages; India.
Intellectual Property Office of Singapore; Invitation to Respond to Written Opinion, issued in connection with application No. 11201805367W; dated Mar. 2, 2020; 34 pages; Singapore.

\* cited by examiner

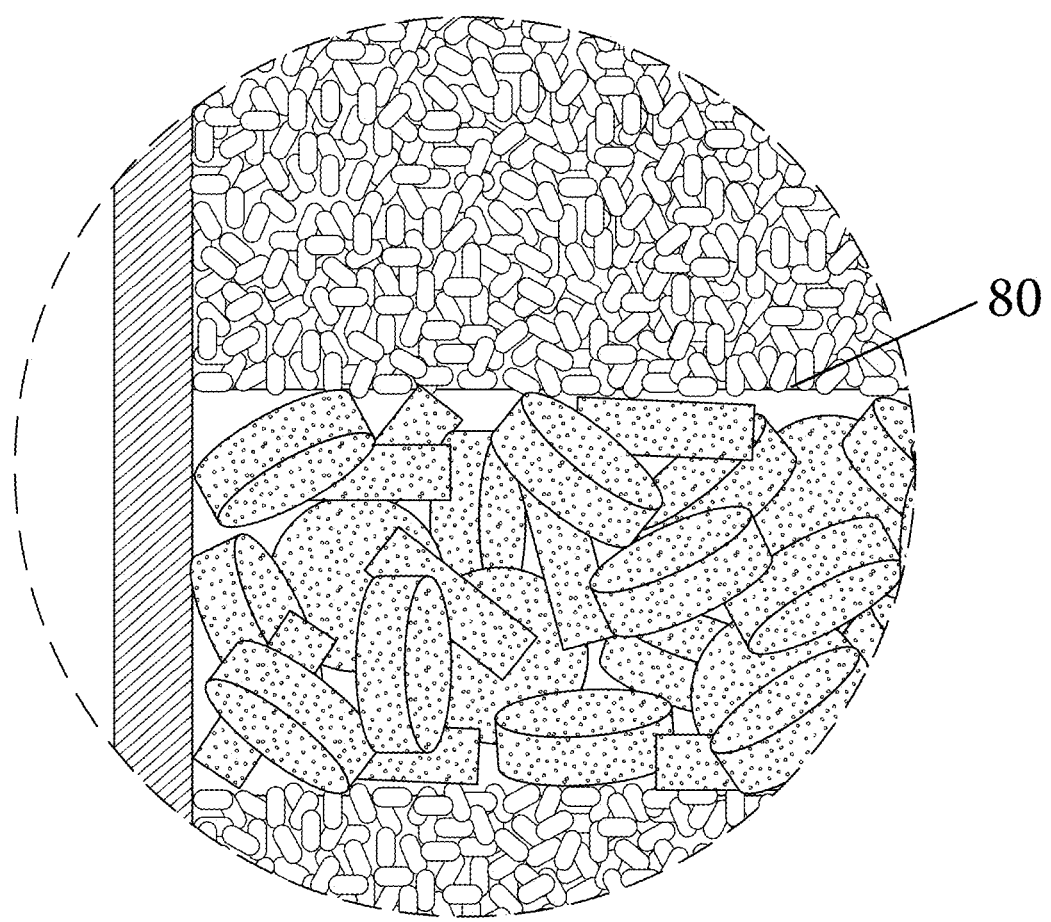
*FIG.* 1B

USE OF TREATING ELEMENTS TO FACILITATE FLOW IN VESSELS

RELATED APPLICATIONS

This application is a continuation application and claims the benefit, and priority benefit, of U.S. patent application Ser. No. 16/105,781, filed Aug. 20, 2018, which is a continuation and claims the benefit, and priority benefit, of U.S. patent application Ser. No. 15/720,751, filed Sep. 29, 2017, which is a continuation and claims the benefit, and priority benefit, of U.S. patent application Ser. No. 15/676,603, filed Aug. 14, 2017, which claims the benefit and priority benefit of U.S. patent application Ser. No. 15/265,405, filed Sep. 14, 2016, which claims the benefit and priority benefit of U.S. Provisional Patent Application Ser. No. 62/314,069, filed Mar. 28, 2016 and, which claims the benefit and priority benefit of U.S. Provisional Patent Application Ser. No. 62/294,768, filed Feb. 12, 2016, the contents of each are incorporated by reference herein in their entirety.

BACKGROUND

Field of the Invention

The presently disclosed subject matter relates to facilitating the flow of streams within vessels utilized in the process industry.

Description of Related Art

The number of bed vessels installed and operating in industry totals in the tens of thousands worldwide. Bed vessels are usually large with diameters ranging from 4 to 18 feet and heights from 10 to over 100 feet. The volume of such bed vessels is substantially filled with bed vessel internals. Each year, the number of bed vessels that are shutdown or are constructed and commissioned totals in the hundreds. The designed lifetime of these bed vessels is typically measured in decades. Bed vessels used in industry contain appropriate internals which can include one or more beds of solid processing material elements which facilitate intended processing operations. Such solid processing material elements can include, for example, reaction-promoting catalysts and mass transfer-promoting agents including sieves and sorbents. Bed vessels and their contents represent a very sizable investment by the bed vessel owner.

The normal length of a typical bed vessel "on oil" operating cycle (from vessel startup to vessel shutdown) is measured in months or years. Normal operations are usually halted when bed vessel internals reach performance limits or when bed vessel operating conditions, such as temperature or pressure, exceed operating limits. Such shutdowns are typically followed by rejuvenation of, repair to and/or replacement of bed vessel internals followed by restart of operations.

It is known in the art to utilize suitable materials to promote flow distribution for streams entering bed vessels. The purpose of such distribution is to subdivide the streams into rivulets which improve stream contact with bed vessel processing materials. Three dimensional reticulates are known to promote flow distribution. For example, U.S. Pat. Nos. 6,258,900, 6,291,603 and 7,265,189 each describes such reticulated materials.

Many bed vessels face challenges associated with sustaining effective and efficient utilization of bed vessel internals including effective and efficient stream flow distribution across and throughout the beds of solid processing material elements installed in the bed vessels. Inadequate stream flow distribution leads to coalescence of small stream rivulets into larger streams resulting in stream flow channeling which can result in bypassing portions of the bed vessel processing internals.

Stream flow channeling within a bed vessel can occur and change over time due to shifts in operating conditions (e.g., changing compositions of feed streams), operations upsets (e.g., power surges/cuts, pump failures, etc.), natural or accelerated aging of bed vessel internals and the like. Channeling can occur when coalescence is facilitated by smaller fluid streams contacting each other or by contact with other bed vessel internals or with the bed vessel itself. Channeling is undesirable because it results in areas of underexposed and underutilized bed vessel internal materials and areas of overexposed materials. The former can result in significant loss of bed vessel productivity and profitability. The latter can result in so-called "hot spots" where sharp temperature gradients cause damage to the vessel and its internals.

One approach to coping with these situations has been to tolerate moderate bed vessel underperformance and operate the vessel until performance has degraded to an unacceptable level. At such a time, the bed vessel is shutdown so that bed vessel internals can be adjusted, rejuvenated or replaced. This mode of operation results in reduced "on-oil" operating time with accompanying loss of bed vessel productivity and profitability.

Another approach has been to install one or more conventional structured engineering devices at appropriate locations within the bed vessel to facilitate flow redistribution within and across the cross section of bed vessels and, in doing so, increase stream flow contact with bed vessel internals (including beds of solid processing materials) and reduce the negative consequences of stream flow channeling. Such conventional devices include engineered equipment structures that are typically form-fitted to the inside of the bed vessel and which can occupy up to ten feet of depth within the bed vessel. Such devices are costly to design, fabricate, install, operate and maintain and requires specially-trained personnel to do so. These conventional devices also require complex monitoring and containment systems to ensure segregation from other bed vessel internals. In the example of catalytic reactors, this applies to segregating conventional redistribution devices from catalyst via "catalyst containment" equipment and measures. Any loss of catalyst containment can result in process and safety risks. Considerable measures are taken and bed vessel space dedicated to ensuring that catalyst containment is ensured. The very presence of such conventional redistribution and containment equipment and the difficulty of sustaining their stable and controlled operation can lead to problems up to and including development of bed vessel shell hot spots leading potentially to rupture of the bed vessel itself.

The very presence of such conventional structured engineered devices consumes space that could otherwise be consumed by more productive and more profitable bed vessel internals, such as catalyst. An example of such a structured engineered apparatus and its use as a flow distributor is shown in U.S. Pat. No. 7,314,551 granted Jan. 1, 2008 to UOP, LLC of Des Plaines, Ill.

Improvements in this field of technology are desired.

SUMMARY

In accordance with the presently disclosed subject matter, various illustrative embodiments of methods for facilitating the distribution and redistribution of the flow of one or more streams within vessels are provided. Streams can include liquid and vapor streams, combinations of the two and mixtures of the two. Vessels can include those containing beds of solid materials utilized for processing (hereinafter referred to as "bed vessels").

In certain illustrative embodiments, a method of improving the distribution and redistribution of the flow of one or more streams in a bed vessel is provided. The bed vessel can be configured to have more than one processing zone positioned vertically with respect to one another within the bed vessel with one uppermost processing zone and one or more processing zones positioned downstream of the uppermost processing zone. The processing zones can contain beds of solid processing material elements. Redistribution treating zones can be disposed downstream of an upstream processing zone and upstream of a downstream processing zone in order to facilitate effective and efficient redistribution of the flow of streams exiting the upstream processing zone and entering said downstream processing zone. One primary objective of such redistribution treating zones is to facilitate the dispersal across the cross sectional area of the downstream processing zone of the stream exiting the upstream processing zone and entering the downstream processing zone. The stream exiting the redistribution treating zone and entering the downstream processing zone can be subdivided into small individual stream rivulets, which is an improvement over the channeled stream entering the redistribution treating zone from the upstream processing zone. The dispersed stream rivulets affect improved contact with and utilization of the beds of solid processing material elements contained in the downstream processing zone. The bed vessel's utilization and performance can be significantly improved compared with the utilization and performance of a bed vessel configuration that excludes the presence of said redistribution treating zones.

In certain illustrative embodiments, a method of improving flow distribution for one or more streams in, or at various locations throughout, a bed vessel is provided. The one or more streams can be passed through an upstream processing zone and a downstream processing zone within the bed vessel. The upstream processing zone and downstream processing zone can each contain one or more beds of solid processing material elements. The one or more streams can also be passed through at least one redistribution treating zone located between the upstream processing zone and downstream processing zone. The redistribution treating zone can contain treating material that redistributes the flow of the one or more streams. The beds of solid processing material elements in the upstream processing zone can be separated from the treating materials in the immediate downstream redistribution zone by a permeable barrier. Alternatively, the upstream processing zone materials can be directly adjacent to and in contact with the treating materials in the immediately downstream redistribution treating zone, without any physical equipment or barrier therebetween, such that the solid processing material elements from the upstream processing zone are capable of at least partially commingling with the treating materials in the immediately downstream redistribution treating zone to create a combo-zone containing both solid processing material elements and treating materials and possessing both processing and stream distribution treatment functionalities. Such migration is typically limited to the first few inches of depth of the redistribution treating zone materials. The solid processing material elements can occupy at least 20% of the volume of that portion of the layer of treating materials contained in the redistribution treating zone into which the solid processing material elements have migrated.

The redistribution treating zone can be downstream of and directly adjacent to the upstream processing zone such that certain of the solid processing material elements from the upstream processing zone migrate into the redistribution treating zone to create a combo-zone having both solid processing material elements and treating materials commingled therein. In certain illustrative embodiments, there is no physical equipment or barrier disposed in the vessel between the upstream processing zone and the immediately downstream treating zone. The solid processing material elements in the upstream processing zone can migrate into the layer of treating materials contained in the immediately downstream redistribution treating zone. Such migration is typically limited to the first few inches of the redistribution treating zone materials. The solid processing material elements can occupy at least 20% of the volume of that portion of the layer of treating materials contained in the redistribution treating zone into which the solid processing material elements have migrated. In certain illustrative embodiments, solid processing material elements are initially mixed with the materials in the treating zone, such that co-mingling is achieved without the need for migration from other zones.

Redistribution treating zones can have a depth of one foot or less. Redistribution treating zones can have a depth of two feet or less. Redistribution treating zones can have a depth of four feet or less.

Redistribution treating zones can contain treating materials. Such materials can be comprised of at least one layer of fixed, form-fit material conforming to the interior dimensions of the bed vessel. Such form-fit materials, such as fibrous meshes, provide porous structures which facilitate stream flow redistribution. Alternatively, treating materials can be comprised of a plurality of treating elements. The treating elements can be individual treating elements. The treating elements can be disposed in layers. The treating elements can be randomly-packed treating elements. One or more of the treating elements can be ceramic reticulates. One or more of the treating elements can have a quasi ellipsoid shape. One or more of the treating elements can have a triaxial ellipsoid shape. One or more of the treating elements can have an oblate spheroid shape. One or more of the treating elements can have a prolate spheroid shape. One or more of the treating elements can have a briquette shape. One or more of the treating elements can have an asymmetrical spheroid shape. One or more of the treating elements can have an aspherical ellipsoid shape. One or more of the treating elements can have at least one opening formed therein. One or more of the treating elements can have at least one opening formed therethrough. One or more of the treating elements can have one or more asperities formed on the surfaces thereof. The asperities can comprise one or more of flutes, fins, struts, filaments, spikes or hairs.

In certain illustrative embodiments, a method of improving the flow distribution of one or more streams in and throughout a bed vessel is provided in which redistribution treating zones containing a plurality of treating elements is disposed immediately downstream of processing zones. In such a configuration, the solid processing material elements in an upstream processing zone can migrate into the redistribution treating zone and commingle with the treating elements in the redistribution treating zone to form a combo-zone with both solid processing material elements and treating elements and their functionalities.

In certain illustrative embodiments, a method of improving the flow distribution of one or more streams in and throughout a bed vessel is provided in which redistribution treating zones containing a plurality of treating elements is disposed immediately downstream of processing zones. In such a configuration, the solid processing material elements in an upstream processing zone are commingled with the treating elements in the redistribution treating zone to form a combo-zone with both solid processing material elements and treating elements and their functionalities.

BRIEF DESCRIPTION OF DRAWINGS

FIG. 1B is a partial cross-sectional side view of a bed vessel having a plurality of zones with a close up view of adjacent zones in the bed vessel with a permeable barrier therebetween in accordance with an illustrative embodiment of the presently disclosed subject matter.

Figure 1A:
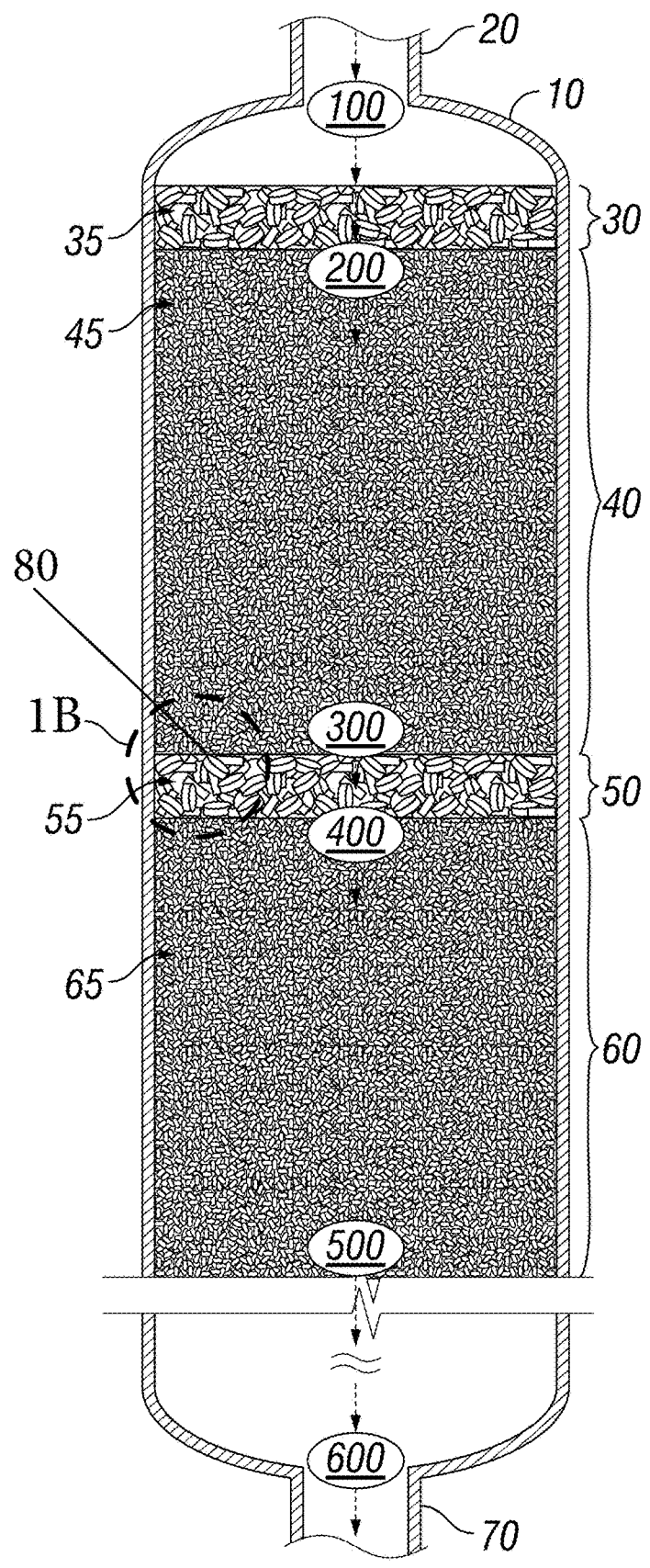
FIG. 1A is a partial cross-sectional side view of a bed vessel having a plurality of zones in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

In accordance with the presently disclosed subject matter, various illustrative embodiments of methods for facilitating the redistribution and lateral redispersion of the flow of one or more streams within bed vessels are provided.

The concept of "redistribution" as described in the presently disclosed subject matter concerns the division and dispersion of process streams across and throughout the internals contained within a bed vessel. Such division and dispersion is facilitated by redistribution treating zones disposed to counter negative stream coalescing effects which cause stream channeling and which, at best, prevent achievement of the designed performance of the processing zones installed within the bed vessel and, at worst, cause unsafe operating circumstances which increase operating risk.

In certain illustrative embodiments, disposed within such bed vessels are internal materials and structures as well as multiple operating zones. One type of operating zone can be a processing zone composed of one or more beds of solid processing material. A second type of operating zone can be a treating zone. Treating zones can facilitate the distribution and dispersion of the one or more streams exiting or entering processing zones. The distribution can facilitate contact between the streams and the beds of solid processing material elements contained in the processing zones. A treating zone positioned between an upstream processing zone and a downstream processing zone can also be called a redistribution treating zone.

In certain illustrative embodiments, redistribution treating zones can be utilized in the bed vessels. The redistribution treating zones can contain treating materials at sufficient depths and locations to facilitate desired stream flow redistribution and redispersion across and throughout the downstream processing zone beds of solid processing material elements.

In certain illustrative embodiments, the redistribution treating materials can be comprised of at least one layer of fixed, form-fit material conforming to the interior dimensions of the bed vessel. Alternatively, redistribution treating materials can be in the form of a plurality of individual treating elements that are randomly or otherwise packed into treating zone layers.

In certain illustrative embodiments, the individual redistribution treating elements can have a variety of shapes and sizes including discs, spheres, rings, wagon wheels, hollow tubes and the like. The one or more of the redistribution treating elements can have at least one or more openings therein and/or therethrough. The one or more of the redistribution treating elements can have one or more asperities formed on the surfaces thereof which can include, without limitation, flutes, fins, struts, filaments, spikes or hairs. The one or more of the redistribution treating elements can be ceramic reticulates. Reticulates are characterized as having one or more open cells which form a plurality of interconnected fluid flow pathways within and through the elements. Such pathways can have tortuous geometries. Such redistribution treating elements with their openings, asperities and interconnected internal fluid flow pathways have large surface areas which facilitate stream flow division and redistribution. Such redistribution treating elements shall hereinafter be referred to as "treating elements."

In certain illustrative embodiments, one or more of the treating elements can have a quasi ellipsoid shape. For example, one or more of the quasi ellipsoid shaped treating elements can have a triaxial ellipsoid shape. The one or more of the quasi ellipsoid shaped treating elements can also have an oblate spheroid shape. The one or more of the quasi ellipsoid shaped treating elements can also have a prolate spheroid shape. The one or more of the quasi ellipsoid shaped treating elements can also have a briquette shape. The one or more of the quasi ellipsoid shaped treating elements can also have an asymmetrical spheroid shape. The one or more of the quasi ellipsoid shaped treating elements can also have an aspherical ellipsoid shape.

In certain illustrative embodiments, the prolate, oblate, and asymmetric shaped quasi ellipsoids can have one mathematic model which can be generalized to all three shapes. For example, the oblate and prolate shaped spheroids can be special cases of the generic, asymmetric ellipsoid (a=b, b=c, or a=c), or shapes substantially similar to such shapes, according to the following formula:

$$\frac{x^2}{a^2} + \frac{y^2}{b^2} + \frac{z^2}{c^2} = 1$$

In certain illustrative embodiments, the briquette shape can be defined as the volumetric intersection of two or more elliptical cylinders where the major-axes of the elliptical faces of each cylinder are coplanar, or shapes substantially similar to such shapes.

In certain illustrative embodiments, redistribution treating zones within bed vessels can have a depth of one foot or less. Alternatively, redistribution treating zones can have a depth of two feet or less. Alternatively, redistribution treating zones can have a depth of four feet or less.

In certain illustrative embodiments, a redistribution treating zone containing a plurality of randomly-packed individual treating elements can be disposed immediately downstream of an upper processing zone without any barrier between the two zones. In such a configuration, the individual solid processing material elements in the upper processing zone can migrate into the top few inches of the layer of treating elements in the downstream redistribution treating zone and commingle with these elements. Typical treating elements are each up to 50 times the size of individual solid processing material elements, in certain illustrative embodiments. With some solid processing material elements, treating elements can be over 100 times the size of individual solid processing material elements, in certain illustrative embodiments. With some solid processing material elements, treating elements can be over 200 times the size of individual solid processing material elements, in certain illustrative embodiments.

The commingling of the individual solid processing material elements from the upper processing zone with the treating elements of the downstream redistribution treating zone results in solid processing material elements consuming at least 20% of the volume of that portion of the redistribution treating zone into which said solid processing material elements have migrated, in certain illustrative embodiments. Such a zone containing commingled solid processing material elements and treating elements shall be referred to herein as a "combo-zone," wherein solid processing material elements are mixed with and/or have migrated into a redistribution treating zone and are commingled with treating elements present in the treating zone. Combo-zones are especially beneficial because they consume a modest amount of bed depth and simultaneously and inexpensively improve both the processing and redistributive functions being performed within the bed vessel.

To facilitate commingling of combo-zone materials, loading procedures for bed vessel materials can call for sequential loading, for example, partial loading of a portion of the treating materials contained in a redistribution zone followed by partial loading of solid processing material elements followed by additional partial loading of treating elements followed by processing material elements. In certain illustrative embodiments, loading in this manner will facilitate the migration of materials from one zone to another within the vessel and commingling of said materials in the combo-zone during process operations. In certain illustrative embodiments, the material may also be mixed during loading such that commingling of materials in the combo-zone is initially achieved without the need for any materials to migrate from one zone to another within the vessel.

A redistribution treating zone can be of sufficient depth and location to improve the utilization and performance of the immediately downstream processing zones by efficiently facilitating the redistribution and redispersion of the flow of fluid streams exiting the redistribution treating zone and entering the downstream processing zones.

Redistribution treating zones can obviate the need for costly and risky conventional structured engineering devices and free valuable vessel volume (that is, bed depth) for more productive uses such as additional processing materials (e.g., catalyst).

In certain illustrative embodiments, bed vessel internals can be configured to include multiple processing zones, treating zones and/or combo-zones. Overall bed vessel performance is dependent on the proper performance of each zone. Zones with processing functionality can perform their designed functions depending on the extent to which streams passing through said processing zones effectively interact with the solid processing material elements in the processing zones. Zones with treating functionality can ensure that suitably distributed streams are delivered to zones with processing functionality. Within the dimensional constraints of the bed vessels themselves, maximizing bed vessel performance can typically be achieved by minimizing the space (that is, bed depth) consumed by treating materials and maximizing the space (that is, bed depth) consumed by processing material elements. For example, in certain illustrative embodiments, the presently disclosed subject matter relates to processing zones of solid processing material elements that are composed of relatively small individual elements whose size varies from that of rice to that of corn kernels.

Relative to conventional solutions, the presently disclosed subject matter advantageously provides stream flow redistribution options that: (i) are less costly and less complex to design, fabricate, install, operate and maintain, (ii) free volume (that is, bed depth) in the bed vessel that can be better filled with more productive bed vessel internals—such as additional solid processing material elements, (iii) avoid the operating risks associated with "containment" related facilities and (iv) improve bed vessel performance and profitability via increased contact and interaction between streams and bed vessel processing materials.

Various illustrative embodiments of a method for redistributing the flow of one or more streams within a bed vessel are provided herein. Referring now to FIG. 1A, a bed vessel 10 is shown having two processing zones 40, 60 disposed therein. Bed vessel 10 is illustrated in a down-flow configuration, such that the one or more input streams 100 will enter the bed vessel 10 at the inlet 20 and the one or more product streams 600 will exit the bed vessel 10 at the outlet 70.

In certain illustrative embodiments, input streams 100 enter the vessel and pass through a "top bed" zone 30 containing elements 35. The top bed zone can facilitate distribution of the input streams 100 across the cross-section of processing zone 40. The top bed zone can also facilitate filtration of particulate contaminants contained in the input streams 100. The top bed zone can also mitigate undesired species contained in input streams 100. The stream 200 exiting the "top bed" zone 30 will possess these desirable characteristics before entering processing zone 40.

In certain illustrative embodiments, process streams 200 are processed in process zone 40 and the resulting process streams 300 exit zone 40. A redistribution treating zone 50 containing treating elements 55 can be provided in the bed vessel 10 downstream of the first processing zone 40. In certain illustrative embodiments, the flow of the one or more streams 300 may be divided and redistributed in redistribution treating zone 50 before being introduced to a downstream processing zone 60.

FIG. 1B shows an enlarged view of redistribution zone 50 containing treating elements 55 disposed between processing zones 40 and 60. In this embodiment, a permeable barrier 80 is placed between processing zone 40 and redistribution zone 50 in order to separate the processing zone 40 from the redistribution treating zone 50 and prevent migration of processing zone materials 45 while still allowing stream flow 300 to pass through to zone 40 to zone 50. In other words, redistribution treating zone 50 is directly adjacent to upstream processing zone 40 and a permeable barrier 80 is disposed between zone 50 and zone 40 such that the processing materials 45 from zone 40 cannot migrate into zone 50 but the stream flow may pass through the barrier 80. In certain illustrative embodiments, permeable barrier 80 can be a wire screen mesh.

Figure 2A:
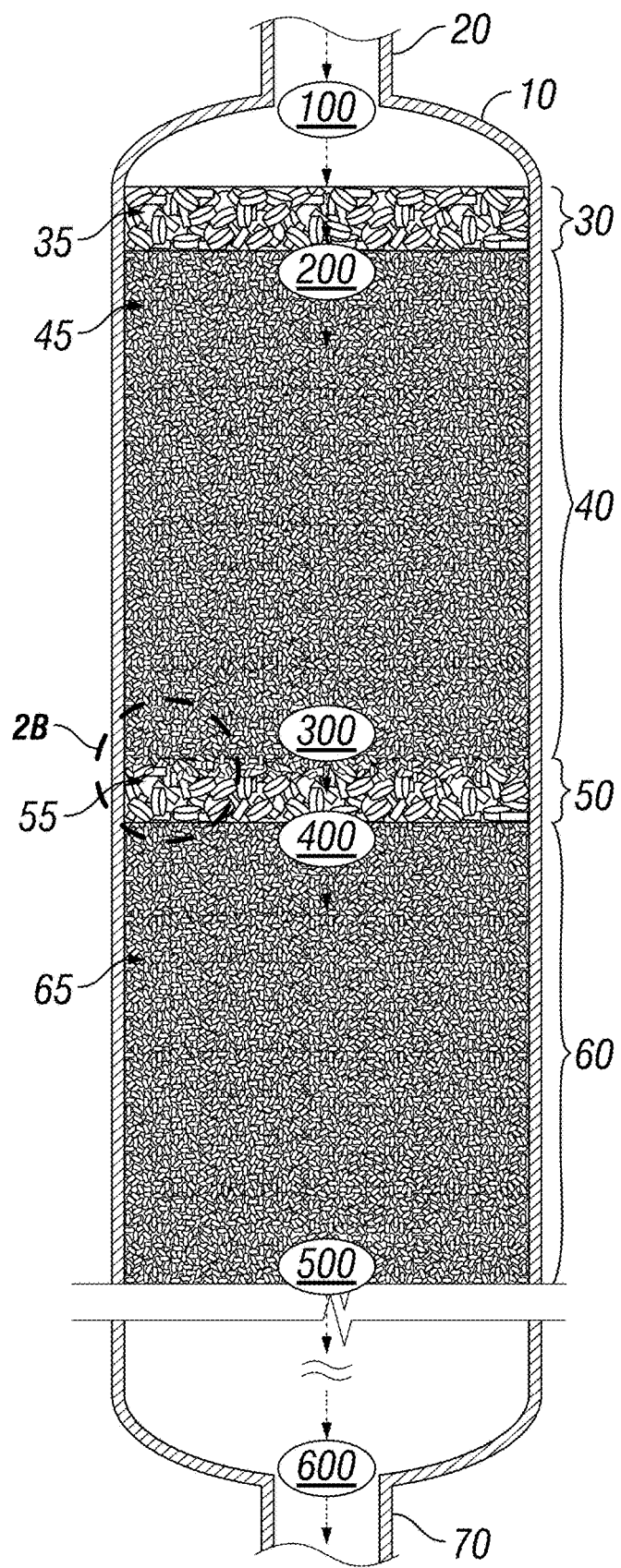
FIG. 2A is a partial cross-sectional side view of a bed vessel having a plurality of zones in accordance with an illustrative embodiment of the presently disclosed subject matter.
Figure 2B:
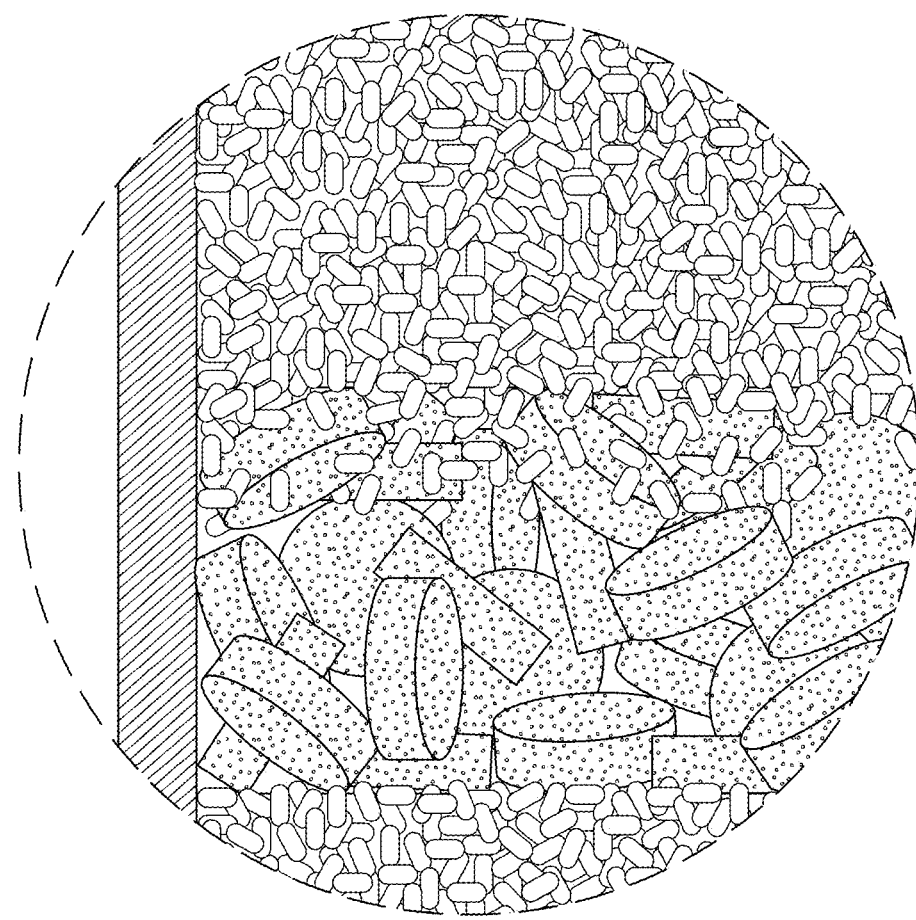
FIG. 2B is a partial cross-sectional side view of a bed vessel having a plurality of zones with a close up view of a combo-zone between two adjacent zones in the bed vessel in accordance with an illustrative embodiment of the presently disclosed subject matter.
Figure 3:
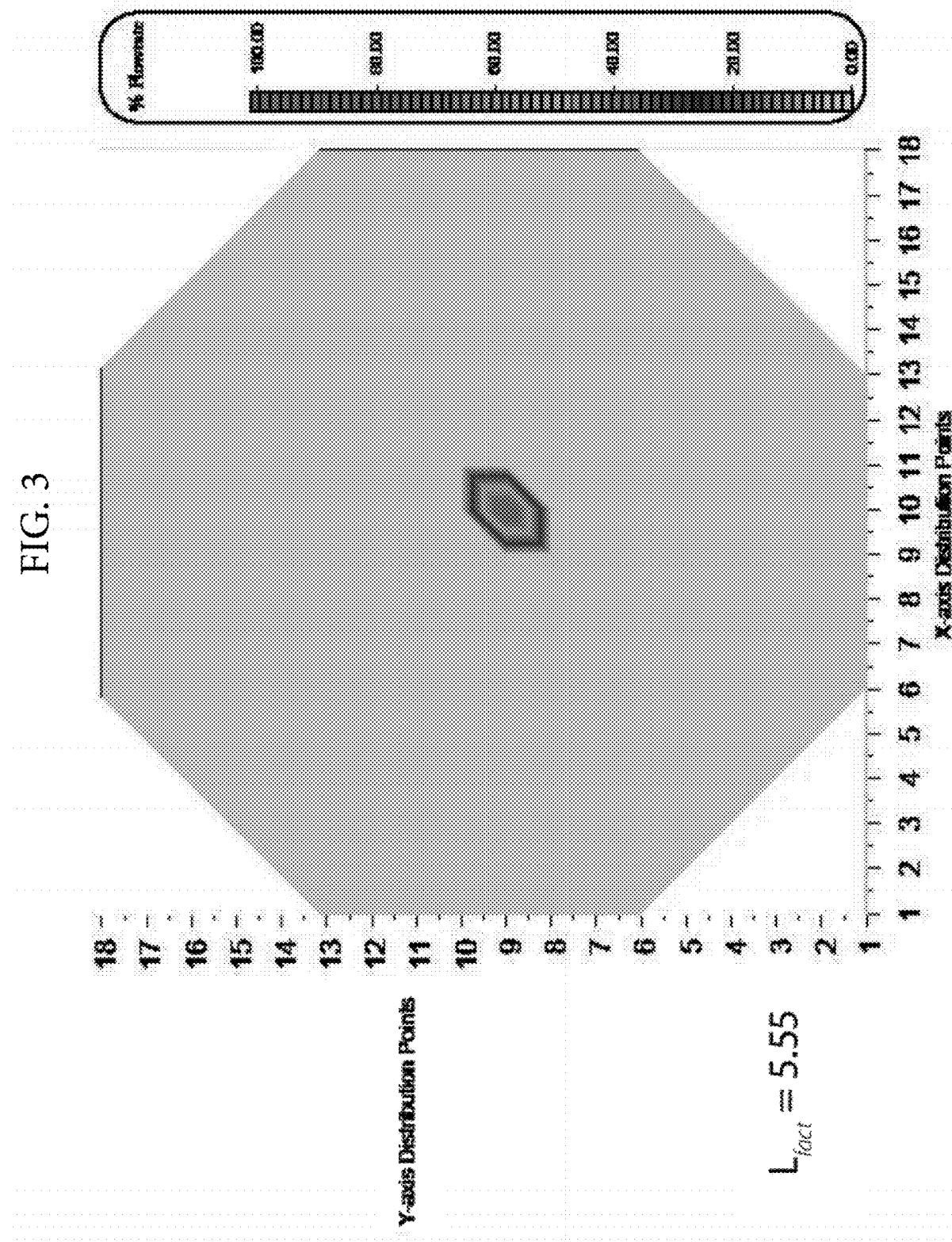
FIG. 3 is a graph showing flow redistribution test results for an empty test vessel in accordance with an illustrative embodiment of the presently disclosed subject matter.

FIGS. 2A and 2B show a bed vessel configuration similar to that in FIGS. 1A and 1B. However, as shown in the enlarged view of FIG. 2B, no barrier is placed between the upper processing zone 40 and the redistribution treating zone 50. In such an embodiment, a combo-zone can be formed (as depicted in FIG. 2B) wherein individual elements of processing zone materials 45 can migrate into and commingle with the top few inches of the layer of redistribution zone treating elements 55.

Such a combo-zone configuration lacking barrier constraints between the processing zone and the redistribution treating zone has the following advantages: (i) eliminates the need for and cost of design, fabrication, installation, operation and maintenance of such barriers, (ii) reduces the space required to install such barriers, (iii) minimizes the space required to achieve desired flow redistribution, (iv) allows for an increase in processing zone performance due to the addition of processing zone materials in the space freed by the absence of barriers, (v) adds additional processing zone performance due to the presence of processing zone materials in the combo-zone and (vi) increases the performance and profitability of the bed vessel by increasing interaction between streams and the vessel's processing zone materials.

In certain illustrative embodiments, the combo-zone will comprise the first few inches of depth of the redistribution treating zone 50. This is in the context of a bed vessel that may be as tall as 100 feet or more with operating zones that substantially fill the vessel. In certain illustrative embodiments, the combo-zone will comprise about the first two (2) inches of depth of the redistribution treating zone 50. In certain illustrative embodiments, the combo-zone will comprise about the first six (6) inches of depth of the redistribution treating zone 50. In certain illustrative embodiments, the combo-zone will comprise the first twelve (12) inches of depth of the redistribution treating zone 50.

As shown in FIG. 1A, redistribution treating zone 50 can be located at or near an upper region of vessel 10, in certain illustrative embodiments, to facilitate redistribution of process steam flow from processing zone 40 into processing zone 60 and/or other lower-positioned zones within vessel 10. In this regard, there can be one or more processing zones and redistribution zones disposed between streams 500 and 600 in vessel 10 that are located downstream from the zones as depicted in FIG. 1A.

In certain illustrative embodiments, stream flow redistribution is primarily facilitated by contacting the stream with the surfaces of the redistribution zone treating elements. These surfaces include the external surfaces of the treating elements and the internal surfaces of the treating elements. The internal geometries of treating elements create large surface areas formed by openings, asperities and a plurality of interconnected internal fluid flow pathways.

In certain illustrative embodiments, the surface area of individual treating elements can be from 70% to 90% internal surface area with the remainder being external surface area. A result is that, for a given volume of treating elements, treating element shapes that pack more densely provide more surface area than treating element shapes that pack less densely. Stream flow redistribution capability per volume of packed treating elements, therefore, increases as packing density increases. This applies as well to the external void space between packed treating elements which decreases as packing density increases.

In certain illustrative embodiments, the amount of material required in a treating zone to achieve a desired level of stream flow redistribution in a bed vessel is primarily a function of the total volume of materials not including voidage external to the treating elements. Relative to cylindrical reticulates, quasi-ellipsoid shaped treating elements tend to pack with less void space between individual elements. For example, treating zones of quasi-ellipsoidal shaped treating elements can have external void space of 25 to 35% compared to 40 to 55% for treating zones of cylindrical reticulates. To achieve a desired level of stream flow redistribution, this can result in treating zones of quasi-ellipsoid shaped treating elements less deep than those formed by an equivalent amount of cylindrical reticulates. This saves space in the bed vessel.

Further, the ability of a treating zone of individual treating elements to redistribute the flow of one or more process streams depends in part on the number of contact points each treating element has with its neighboring elements. Maximizing contact points facilitates stream flow redistribution thru the treating zone. Treating zones of quasi-ellipsoidal treating elements can have 60 to 90% more of such contact points than do equivalent layers of cylindrical or spherical reticulates.

To facilitate a better understanding of the presently disclosed subject matter, the following examples of certain aspects of certain embodiments are given. In no way should the following examples be read to limit, or define, the scope of the presently disclosed subject matter.

Experiments were performed to demonstrate process stream redistribution, including the mitigation/elimination/disruption/reduction of channeling, of a process stream exiting an upstream bed vessel processing zone and transiting/passing thru a bed vessel redistribution treating zone in accordance with certain illustrative embodiments of the presently disclosed subject matter.

A fabricated testing structure was assembled including a vertical cylindrical vessel approximately 12 inches in diameter and over 36 inches tall. A nozzle located above the centerpoint of the vessel was used to pass liquid into the vessel. The cylindrical vessel provided sufficient space for a bed of randomly-packed test elements up to 36 inches deep. Over 300 holes, each ¼" in diameter were drilled in a regular grid pattern thru the bottom of the vessel. Each hole was individually connected to a plastic tube utilized to collect and measure liquid exiting the vessel thru the hole. These holes represent a two dimensional grid zone of the cross-sectional area of the vessel. The liquid collected thru each hole shows the distribution of the inlet liquid across the cross-sectional area of the vessel.

Liquid was pumped thru the nozzle into the vessel. The stream of liquid emulates channeled streams which occur in the processing zones of commercial bed vessels. In one test run, the vessel was empty. In other test runs, various types and depths of test elements were installed. In each test run sufficient time was elapsed to obtain representative quantities of liquid via the tube-connected holes in the bottom of the vessel. Data collection and analysis produced graphical plots demonstrating the ability of the test elements to laterally disperse the liquid thru the test element bed and exit the vessel thru the holes in the bottom of the vessel.

In a typical run in which test elements are placed in the vessel, the liquid is allowed to disperse as it flows around and thru the test elements, exits the vessel thru the grid zone holes and is collected in the tubes below. The amount of water collected in each tube is measured and graphs are prepared which show the extent to which the elements facilitate flow redistribution.

Figure 4:
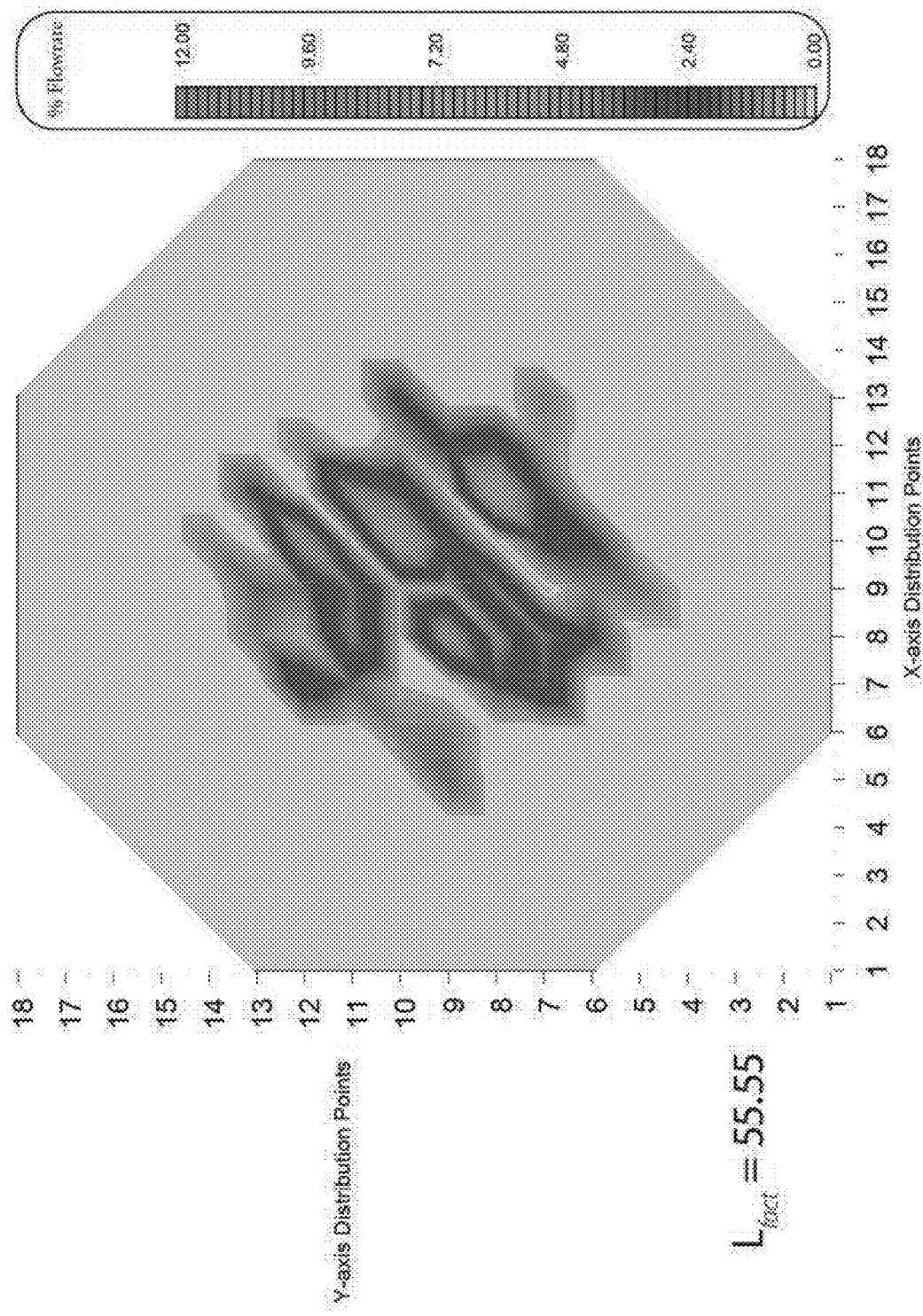
FIG. 4 is a graph showing flow redistribution test results for a bed of randomly-packed ¾" support ball test elements in accordance with an illustrative embodiment of the presently disclosed subject matter.
Figure 5:
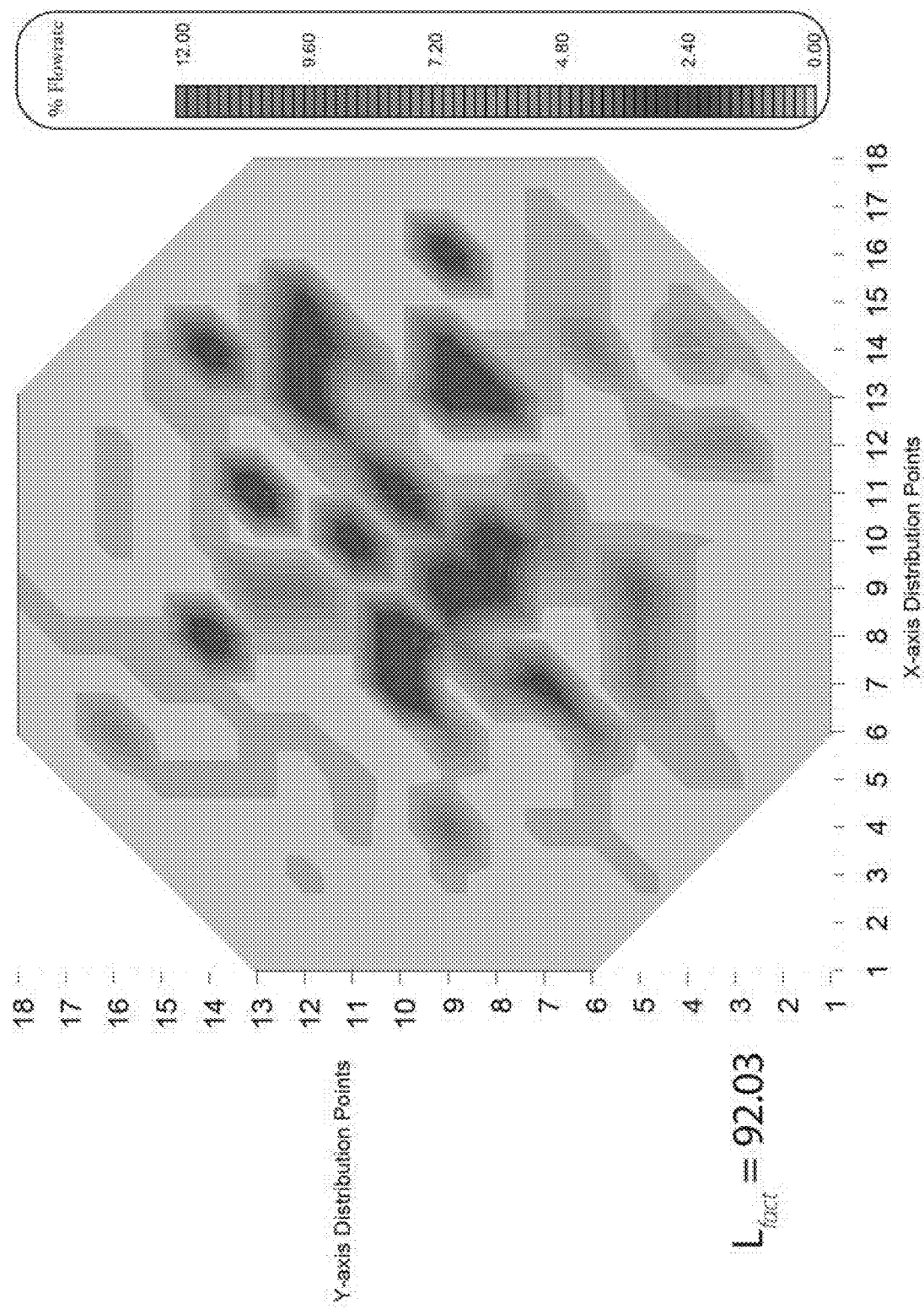
FIG. 5 is a graph showing flow redistribution test results for a bed of randomly-packed treating elements in accordance with an illustrative embodiment of the presently disclosed subject matter.

The graphical plots of flow redistribution test results are shown in FIGS. 4-6. Shown are the amounts of liquid recovered thru the tubes connected to the holes in the vessel grid zone. FIG. 4 shows the flow redistribution test results for an empty test vessel. FIG. 5 shows the flow redistribution test results for a bed of randomly-packed ¾" support ball test elements. FIG. 6 shows the results for a bed of randomly-packed treating elements according to the presently disclosed subject matter.

In FIG. 4, when there were no test elements in the vessel and liquid was run into an empty cylinder, the bank of tubes show just over 5% of the liquid being laterally distributed as measured by the result $L_{fact}$. The greater than 5% result includes the liquid which passed thru the center line holes of the vessel demonstrating that virtually all the liquid exited the vessel through the holes at or near the center of the vessel grid zone. In FIG. 5, the bed of randomly-packed support balls achieved just over 55% lateral distribution of the liquid across the vessel grid zone. In FIG. 6, the test run using a bed of randomly-packed treating elements according to the presently disclosed subject matter achieved over 92% lateral distribution of the liquid across the vessel grid zone.

It can be seen from these test results that beds of the treating elements according to the presently disclosed subject matter can facilitate redistribution of channeled liquid streams exiting an upstream processing zone. Said redistributed streams can then enter a downstream processing zone as a laterally dispersed stream which provides improved contact between the stream and the processing zone elements in the downstream processing zone.

It is to be understood that the presently disclosed subject matter is not to be limited to the exact details of construction, operation, exact materials, or embodiments shown and described, as obvious modifications and equivalents will be apparent to one skilled in the art. Accordingly, the presently disclosed subject matter is therefore to be limited only by the scope of the appended claims.

What is claimed is:

1. A vessel for treating a process stream, the vessel comprising:
   a first processing zone containing a plurality of randomly packed processing materials;
   a second processing zone containing a plurality of randomly packed processing materials; and
   a redistribution zone located between the first processing zone and the second processing zone, the redistribution zone comprising a mix of both processing materials and treating elements, the treating elements having one or more openings formed therein or therethrough,
   wherein there is no space between the upstream processing zone and the redistribution treating zone, and wherein no space between the upstream processing zone and the downstream processing zone is consumed by a structure internal to the process vessel.

2. The vessel of claim 1, wherein the treating elements are capable of mitigating stream channeling of the process stream as it passes from the first processing zone and increases lateral distribution of the flow of the process stream as it passes to the second processing zone.

3. The vessel of claim 1, wherein the redistribution zone is located adjacent to both the first processing zone and the second processing zone.

4. The vessel of claim 1, wherein the process stream comprises a liquid stream, a vapor stream, a combination of a liquid stream and a vapor stream, or a mixture of a liquid stream and a vapor stream.

5. A vessel comprising:
   a vessel inlet;
   a first processing zone disposed downstream of the vessel inlet, the first processing zone containing one or more beds of processing materials;
   a bed zone disposed upstream of the first processing zone;
   a redistribution zone disposed downstream of the first processing zone, the redistribution zone containing a plurality of treating elements, wherein the treating elements are randomly packed within the entire height of the redistribution zone;
   a second processing zone disposed downstream of the redistribution zone, the second processing zone containing one or more beds of processing materials; and
   a vessel outlet disposed downstream of the second processing zone,
   wherein the redistribution zone is located adjacent the first processing zone and wherein there is no physical barrier located between the redistribution zone and the first processing zone in the vessel, such that at least some of the processing materials from the first processing zone can migrate into the redistribution treating zone and commingle with the treating elements to create a combo-zone containing a mix of both processing materials and treating elements and having both processing zone functionality and treating zone functionality,
   and wherein no space between the upstream processing zone and the downstream processing zone is consumed by a structure internal to the process vessel.

6. The vessel of claim 5, wherein the treating elements in the redistribution zone are capable of mitigating stream channeling of a process stream passing from the first processing zone and affecting lateral distribution of the flow of a process stream passing to the second processing zone.

7. The vessel of claim 5, wherein the bed zone comprises one or more filtration materials.

8. The vessel of claim 5, wherein the bed zone comprises one or more treating elements.

9. The vessel of claim 5, wherein the bed zone comprises one or more processing materials.

10. The vessel of claim 5, wherein the bed zone comprises one or more materials having filtration, treating and processing functionality.

11. The vessel of claim 5, wherein the bed zone comprises one or more materials capable of mitigating undesired species in a process stream prior to the process stream entering the first processing zone.

12. The vessel of claim 11, wherein the process stream comprises a liquid stream, a vapor stream, a combination of a liquid stream and a vapor stream, or a mixture of a liquid stream and a vapor stream.

13. A vessel comprising:
a vessel inlet;
a first processing zone disposed downstream of the vessel inlet, the first processing zone containing one or more beds of processing materials;
a bed zone disposed upstream of the first processing zone;
a redistribution zone disposed downstream of the first processing zone, the redistribution zone containing a plurality of treating elements;
a second processing zone disposed downstream of the redistribution zone, the second processing zone containing one or more beds of processing materials; and
a vessel outlet disposed downstream of the second processing zone,
wherein there is a permeable barrier above the redistribution zone that is capable of preventing migration of processing materials into the redistribution zone while allowing a process stream to pass into the redistribution zone,
and wherein no space between the upstream processing zone and the downstream processing zone is consumed by a structure internal to the process vessel.

14. The vessel of claim 13, wherein the treating elements in the redistribution zone are capable of mitigating stream channeling of a process stream passing from the first processing zone and affecting lateral distribution of the flow of a process stream passing to the second processing zone.

15. The vessel of claim 13, wherein a section of the redistribution zone at the interface of the first processing zone and the redistribution zone contains a mix of both processing materials and treating elements.

16. The vessel of claim 13, wherein the redistribution zone contains a mix of both processing materials and treating elements.

17. The vessel of claim 13, wherein the bed zone comprises one or more filtration materials.

18. The vessel of claim 13, wherein the bed zone comprises one or more treating elements.

19. The vessel of claim 13, wherein the bed zone comprises one or more processing materials.

20. The vessel of claim 13, wherein the bed zone comprises one or more materials having filtration, treating and processing functionality.

21. The vessel of claim 13, wherein the bed zone comprises one or more materials capable of mitigating undesired species in a process stream prior to the process stream entering the first processing zone.

22. The vessel of claim 13, wherein the process stream comprises a liquid stream, a vapor stream, a combination of a liquid stream and a vapor stream, or a mixture of a liquid stream and a vapor stream.

23. The vessel of claim 1, further comprising a bed zone disposed upstream of the first processing zone, wherein the bed zone comprises one or more of filtration materials, processing materials and treating elements.

24. A vessel for treating a process stream, the vessel comprising:
a first processing zone containing a plurality of randomly packed processing materials;
a second processing zone containing a plurality of randomly packed processing materials; and
a redistribution zone located between the first processing zone and the second processing zone, the redistribution zone comprising a mix of both processing materials and treating elements, the treating elements having one or more openings formed therein or therethrough,
wherein the treating elements have one or more asperities formed on the surfaces thereof, the asperities comprising one or more of flutes, fins, struts, filaments, spikes or hairs.

25. The vessel of claim 24, wherein no space between the upstream processing zone and the downstream processing zone is consumed by a structure internal to the process vessel.

* * * * *